US011662076B2

(12) United States Patent
Qiu et al.

(10) Patent No.: US 11,662,076 B2
(45) Date of Patent: May 30, 2023

(54) VEHICLE LIGHTING DEVICE, VEHICLE HEADLIGHT AND VEHICLE (71) Applicant: HASCO VISION TECHNOLOGY CO., LTD., Shanghai (CN)

(72) Inventors: Zhiping Qiu, Shanghai (CN); Dapan Zhang, Shanghai (CN); Hui Li, Shanghai (CN); He Zhu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 419 days.

(21) Appl. No.: 17/051,810

(22) PCT Filed: Sep. 16, 2019

(86) PCT No.: PCT/CN2019/105939
§ 371 (c)(1),
(2) Date: Oct. 30, 2020

(87) PCT Pub. No.: WO2021/017116
PCT Pub. Date: Feb. 4, 2021

(65) Prior Publication Data
US 2022/0235910 A1    Jul. 28, 2022

(30) Foreign Application Priority Data

Jul. 31, 2019 (CN) .......................... 201910704566.5

(51) Int. Cl.
*F21S 41/657* (2018.01)
*F21S 41/19* (2018.01)
(Continued)

(52) U.S. Cl.
CPC ............. *F21S 41/657* (2018.01); *F21S 41/19* (2018.01); *F21S 41/683* (2018.01); *F21W 2107/10* (2018.01)

(58) Field of Classification Search
CPC ........ F21S 41/657; F21S 41/19; F21S 41/683; F21W 2107/10
See application file for complete search history.

(56) References Cited

U.S. PATENT DOCUMENTS 7,004,603 B2   2/2006   Knight
2006/0133104 A1*  6/2006  Okubo ................ F21S 41/657
                                                362/545

FOREIGN PATENT DOCUMENTS

CN    101251234 A    8/2008
CN    205227122 U    5/2016
CN    208382022 U    1/2019

* cited by examiner

Primary Examiner — Anne M Hines
(74) Attorney, Agent, or Firm — Volpe Koenig (57) ABSTRACT The present disclosure relates to a vehicle lighting system, and discloses a vehicle lighting device. The vehicle lighting device includes a bracket, a plurality of rotating arms and a plurality of lighting modules. The rotating arms include driving columns and rotating shafts; the plurality of lighting modules are mounted on the plurality of rotating arms respectively, and the rotating shafts are rotationally mounted on the bracket, so that the rotating arms can be independently driven by the driving columns to rotate around the rotating shafts; and the rotating shafts are horizontally arranged in parallel. The lighting modules can independently and synchronously rotate up and down, the adjustment range of a light pattern position is wide, an occupied space in a headlight is small, and control is convenient. The present disclosure further discloses a vehicle headlight including the vehicle lighting device, and a vehicle.

9 Claims, 9 Drawing Sheets (51) Int. Cl.
*F21S 41/683* (2018.01)
*F21W 107/10* (2018.01)

VEHICLE LIGHTING DEVICE, VEHICLE HEADLIGHT AND VEHICLE

CROSS REFERENCE TO RELATED APPLICATIONS

This application is a 35 USC § 371 national stage of international application No. PCT/CN2019/105939, which is titled "VEHICLE LIGHTING DEVICE, VEHICLE HEADLIGHT AND VEHICLE, was filed Sep. 16, 2019, and claims priority to Chinese Application No. 201910704566.5, filed on Jul. 31, 2019, both of which are incorporated herein by reference as if fully set forth.

FIELD OF THE INVENTION

The present disclosure relates to a vehicle lighting system, in particular to a vehicle lighting device. In addition, the present disclosure further relates to a vehicle headlight and a vehicle.

BACKGROUND OF THE INVENTION

With the continuous development of vehicle lighting technology, the technical development of lighting devices has been diversified. One of the development trends is to mount multiple lighting modules arranged in a certain way in vehicle lights, making a modeling effect of the vehicle lights better. Lighting areas formed by the lighting modules are superposed on each other to form a high beam light pattern and/or a low beam light pattern.

In order to achieve an ideal lighting light pattern, during the manufacturing process of a vehicle lighting device, the positions of the lighting modules and the position of an assembly composed of the multiple lighting modules need to be adjusted, so that the lighting light pattern can reach the ideal state and position, which is commonly known as dimming operation. Dimming is usually performed in two steps, firstly, the various lighting modules are dimmed, and the relative positions of the lighting areas of the multiple lighting modules are determined by swinging the lighting modules up, down, left and right, and secondly, the position of the entire assembly, namely the above entire lighting light pattern with the relative position being determined, is adjusted relative to a V axis and an H axis, and the light pattern is adjusted to a theoretical position by swinging the assembly up, down, left and right.

Figure 1:
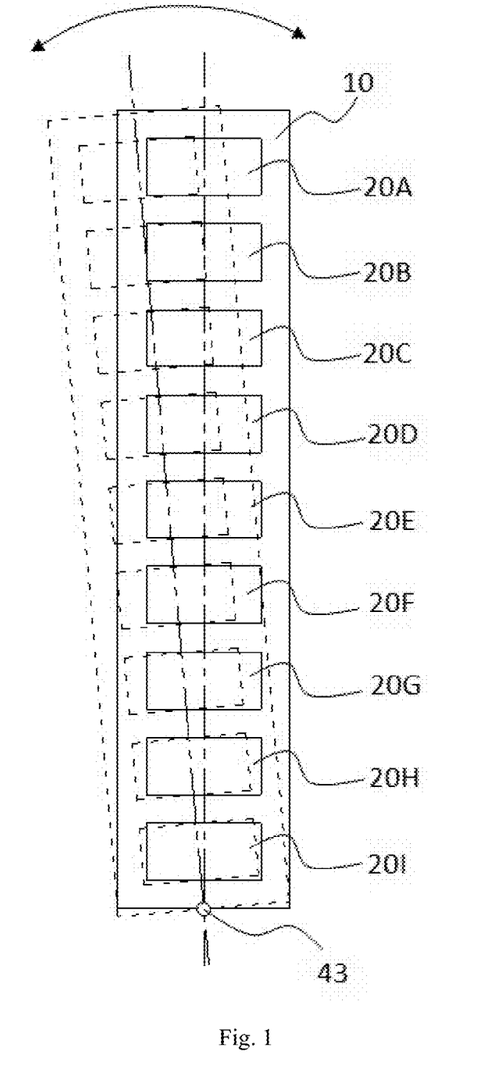
FIG. 1 is a schematic diagram of a dimming mode of a vehicle lighting device in the prior art.

In the actual dimming process, swing angles of the lighting modules and the assembly are relatively small. For a conventional vehicle lighting device composed of a single lighting module, a swing space required for dimming is small. However, for a vehicle lighting device composed of multiple lighting modules, such as a vehicle lighting device shown in FIG. 1, nine lighting modules 20A-20I are arranged in a row on a bracket 10 from top to bottom, when the bracket 10 rotates around a rotation axis 43 at a small angle, such as an angle being 5 degrees, the other end of the bracket 10 swings acutely, so that a large space is required inside a headlight so as to achieve dimming of the assembly, and consequently waste of an internal space and excessively large size of the headlight are caused.

Recently, a technology that multiple lighting modules rotate independently to realize dimming is developed. However, the multiple lighting modules are arranged in a rotatable frame, the adjacent lighting modules are arranged at large intervals due to arrangement of the frame and a space required for rotation of the frame, and the problems of waste of the internal space of the headlight and the excessively large size of the headlight are not effectively solved.

SUMMARY OF THE INVENTION

The technical problem to be solved by the present disclosure is to provide a vehicle lighting device capable of completing a dimming process of the lighting device with smaller space occupation.

The further technical problem to be solved by the present disclosure is to provide a vehicle headlight. The vehicle headlight is good in internal space utilization and small in size.

In addition, the technical problem to be solved by the present disclosure is to provide a vehicle with a small headlight size and convenient dimming.

In order to solve the technical problems, in the first aspect, the present disclosure provides a vehicle lighting device. The vehicle lighting device includes a bracket, a plurality of rotating arms, and a plurality of lighting modules; each rotating arm includes a driving column and a rotating shaft; the plurality of lighting modules are mounted on the corresponding rotating arms; the rotating shafts are rotationally mounted on the bracket, so that the rotating arms can be independently driven by the driving columns to rotate around the rotating shafts; and the rotating shafts are horizontally arranged and are parallel to each other.

Further preferably, the vehicle lighting device also includes a driving part; the driving part includes an upper end guide column, a lower end guide column, and a plurality of slotted holes; axis of the upper end guide column and the lower end guide column are parallel to each other; the driving part is mounted on the bracket through the upper end guide column and the lower end guide column and adapted to move up and down relative to the bracket; and the plurality of driving columns can be mounted in the plurality of slotted holes in a sliding manner correspondingly. According to the preferential technical solution, the plurality of driving columns are mounted in the plurality of slotted holes, when the driving part moves up and down, the plurality of driving columns can be driven to rotate up and down synchronously, and thus the rotating arms and lighting modules mounted on the rotating arms are driven to rotate synchronously. The slotted holes can adapt to vertical movement of the driving part and relative sliding caused during rotational movement of the driving columns.

Further, the vehicle lighting device of the present disclosure also includes a driving mechanism and a connecting rod; one end of the connecting rod is connected with the driving mechanism, the other end of the connecting rod is connected with the driving part; and the driving mechanism is adapted to drive the connecting rod to move up and down and drive the driving part to move up and down through the connecting rod. In the preferential technical solution, the driving part and the driving mechanism are connected together through the connecting rod, the vertical movement caused by the driving mechanism can be transmitted to the driving part, the relative position between the driving mechanism and the driving part can be set conveniently, and therefore the structure of the vehicle lighting device of the present disclosure is more compact.

Further, the driving mechanism includes an electric driving mechanism and/or a manual driving mechanism, and both the electric driving mechanism and the manual driving mechanism are adapted to drive a connecting end of the connecting rod and the driving mechanism to move up and down. According to the preferential technical solution, the electric driving mechanism can drive the driving part to move up and down through an electric control method, thus, the positions of the lighting areas of the lighting modules in a vertical direction are conveniently and synchronously adjusted in real time, namely, the overall position in the vertical direction of a light pattern formed by the combination of the lighting areas is adjusted; and the manual driving mechanism can manually adjust the positions of the lighting areas of the lighting modules when the electric driving mechanism is turned off or fails.

Preferably, the lighting modules are respectively arranged on straight lines on which axis of the corresponding rotating shafts are located. In the preferential technical solution, the lighting modules are arranged on the axis of the corresponding rotating shafts, so that when the lighting modules rotate around the rotating shafts, the displacement of spatial positions of the lighting modules is smaller, and the space occupation area during adjustment is also smaller.

Preferably, each lighting module includes a module dimming mechanism; each module dimming mechanism includes three ball-headed nuts which are not located on a same straight line, and three ball-headed screws matched with the three ball-headed nuts; and the lighting modules are mounted on the corresponding rotating arms through the module dimming mechanisms. In the preferential technical solution, by adjusting rotation positions of the three ball-headed screws in the corresponding ball-headed nuts, the relative positions between the lighting modules and the corresponding rotating arms can be adjusted, and dimming of the lighting modules is achieved. Namely, by adjusting the relative positions of the lighting areas of the lighting modules up, down, left and right, the lighting areas formed by the lighting modules are combined to form an overally designed light pattern of headlight lighting modules of the present disclosure.

Preferably, the plurality of lighting modules include high beam lighting modules and/or low beam lighting modules. According to the preferential technical solution, by controlling the high beam lighting modules and/or the low beam lighting modules, the headlight lighting modules of the present disclosure can form a high beam lighting light pattern, a low beam lighting light pattern, or one of the high beam lighting light pattern and the low beam lighting light pattern.

Preferably, the bracket is mounted on a headlight housing and adapted to rotate around a vertical axis relative to the headlight housing. According to the preferential technical solution, the position of the light pattern formed by the vehicle lighting device of the present disclosure in a horizontal direction can be adjusted by adjusting the rotation position of the bracket around the vertical axis relative to the headlight housing.

In the second aspect, the present disclosure provides a vehicle headlight including the vehicle lighting device provided in the first aspect of the present disclosure.

In the third aspect, the present disclosure provides a vehicle including the vehicle headlight provided in the second aspect of the present disclosure.

According to the above technical solutions, the plurality of lighting modules of the vehicle lighting device of the present disclosure can be driven by the rotating arms to independently rotate around the horizontal rotating shafts which are parallel to each other, so that the positions of the lighting areas formed by the lighting modules in the V-axis direction are synchronously adjusted. Since the bracket does not rotate around a horizontal axis during adjustment, the dimming space required by the vehicle lighting device of the present disclosure is smaller. The lighting modules are mounted on the rotating arms and driven by the rotating arms to rotate, rotating mechanisms do not need to be arranged on the lighting modules, and thus, the lighting modules can be arranged more closely, and positioning of the lighting modules is more accurate. By adopting the driving part for synchronously driving the rotating arms and driving a plurality of lighting units to rotate synchronously through the rotating arms, the position of the light pattern generated by the vehicle lighting device of the present disclosure is adjusted more conveniently. By application of the electric driving mechanism, the light pattern generated by the vehicle lighting device of the present disclosure can be adjusted in real time, and adjustment is more convenient and reliable.

The vehicle headlight formed by the vehicle lighting device of the present disclosure is good in internal space utilization due to the fact that the vehicle lighting device occupies a small space, and the vehicle headlight can also be smaller in size.

The vehicle of the present disclosure adopts the vehicle headlight, so that the headlight is smaller in size, and the light pattern can be adjusted more conveniently.

Other features and advantages of the present disclosure will be described in detail in the following specific implementation modes.

Brief Description of the Symbols:

| 10 | Bracket | 20 | Lighting module |
|---|---|---|---|
| 20A | First lighting module | 20B | Second lighting module |
| 20C | Third lighting module | 20D | Fourth lighting module |
| 20E | Fifth lighting module | 20F | Sixth lighting module |
| 20G | Seventh lighting module | 20H | Eighth lighting module |
| 20I | Ninth lighting module | 30 | Driving part |
| 31 | Upper end guide column | 32 | Lower end guide column |
| 33 | Slotted hole | 40 | Rotating arm |
| 41 | Driving column | 41A | First driving column position |
| 41B | Second driving column position | 42 | Rotating shaft |
| 43 | Rotating axis | 50 | Electric driving mechanism |
| 60 | Manual driving mechanism | 70 | Connecting rod |
| 80 | Ball-headed nut | 81 | First ball-headed screw |

| | | | |
|---|---|---|---|
| 82 | Second ball-headed screw | 83 | Third ball-headed screw |
| 90 | Vertical downward direction | 91 | Vertical upward direction |

DETAILED DESCRIPTION OF THE EMBODIMENTS

According to the present disclosure, unless otherwise stated, directions or positional relationships indicated by positional words such as "up, down, front and rear" are used based on the direction or position relationship in the normal running state of a vehicle after a vehicle lighting device or a vehicle headlight of the present disclosure is mounted on the vehicle.

In the specification, terms "first", "second", . . . , and "ninth" are used for descriptive purposes only and can not be interpreted as indicating or implying relative importance or implicitly indicating the amount of demonstrated technical features. Therefore, features defined as "first", "second", . . . , and "ninth" may explicitly or implicitly include one or more of the features.

In the description of the present disclosure, it should be noted that terms "mounting", "arrangement" or "connection" should be understood in a broad sense unless explicitly stated and defined otherwise, for example, connection may be fixed connection or detachable connection or integral connection, may also be direct connection or indirect connection through an intermediate medium, and may also be internal connection of two elements or interaction between two elements. For ordinary those skilled in the art, the specific meanings of the above terms in the present disclosure can be understood according to specific situations.

The specific implementation modes of the present disclosure are described in detail with reference to the accompanying drawings. It should be understood that the implementation modes described herein are only used to illustrate and explain the present disclosure, and the scope of protection of the present disclosure is not limited to the implementation modes described below.

Figure 5:
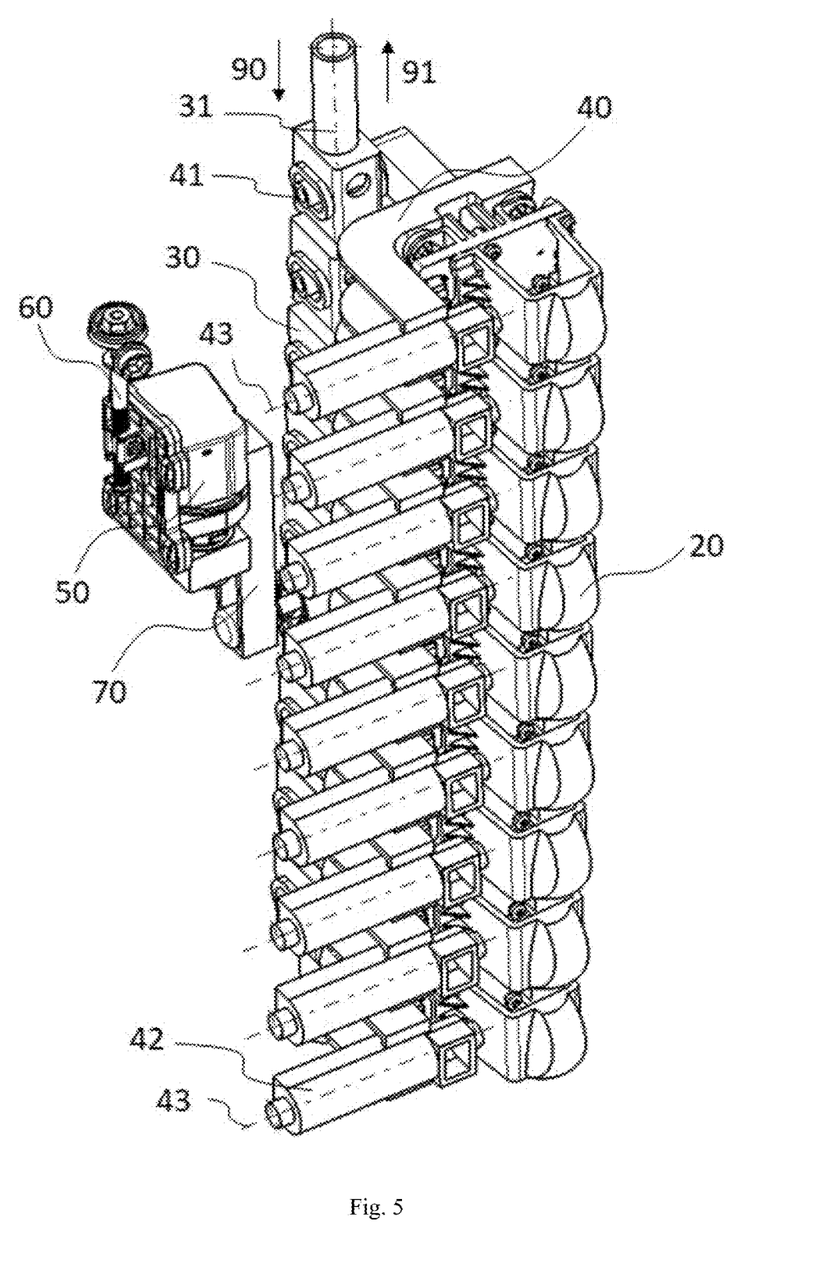
FIG. 5 is a stereoscopic structural schematic diagram of a front side of a vehicle lighting device without a bracket of FIG. 2.
Figure 6:
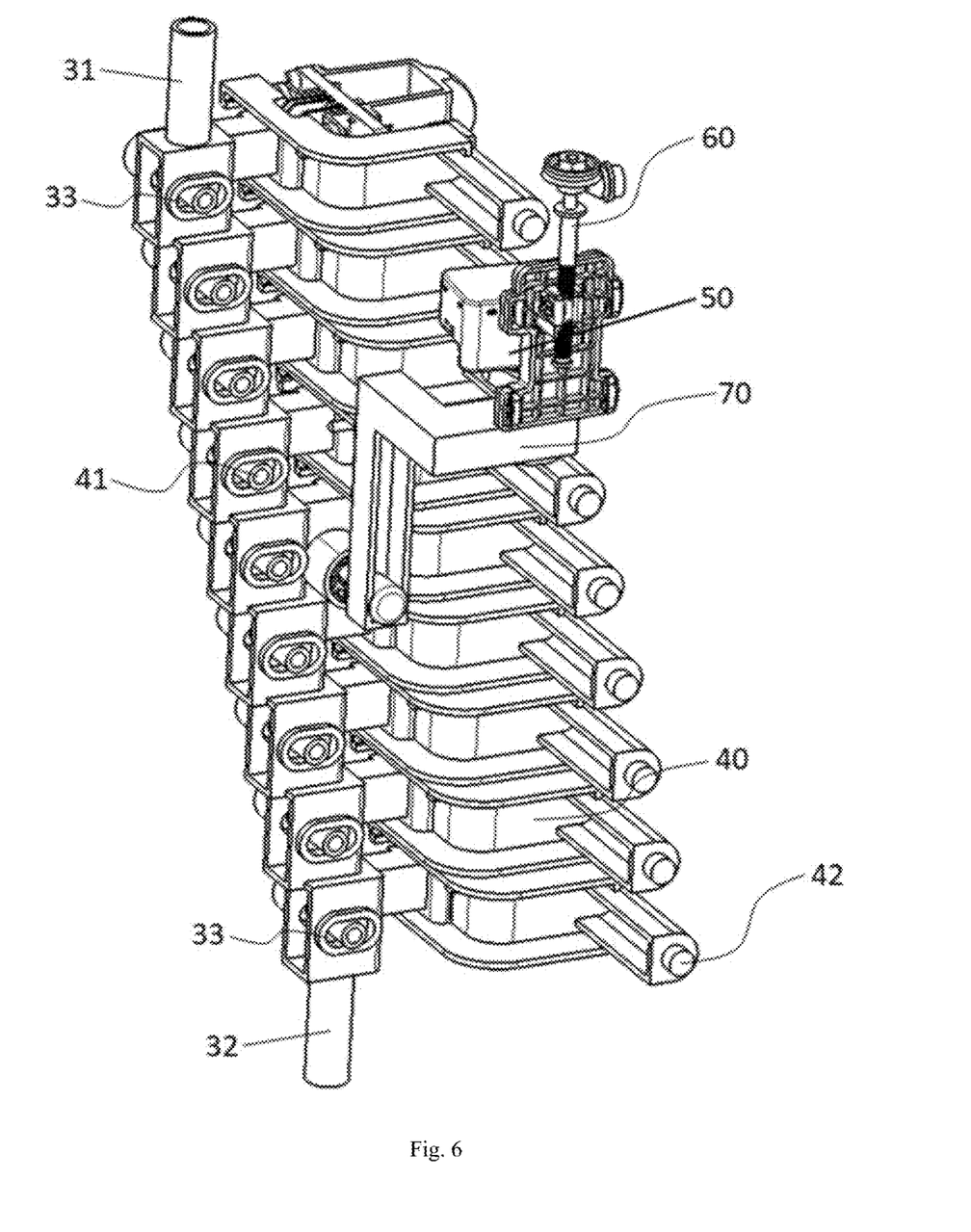
FIG. 6 is a stereoscopic structural schematic diagram of a rear side of FIG. 5.
Figure 7:
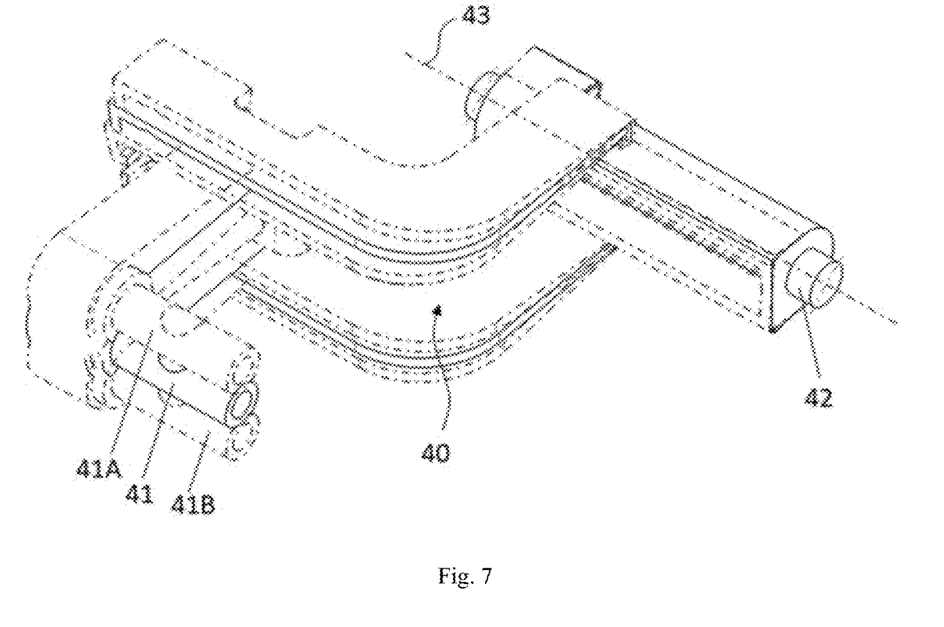
FIG. 7 is a schematic diagram of a rotation state of rotating arms in an embodiment of the present disclosure.
Figure 8:
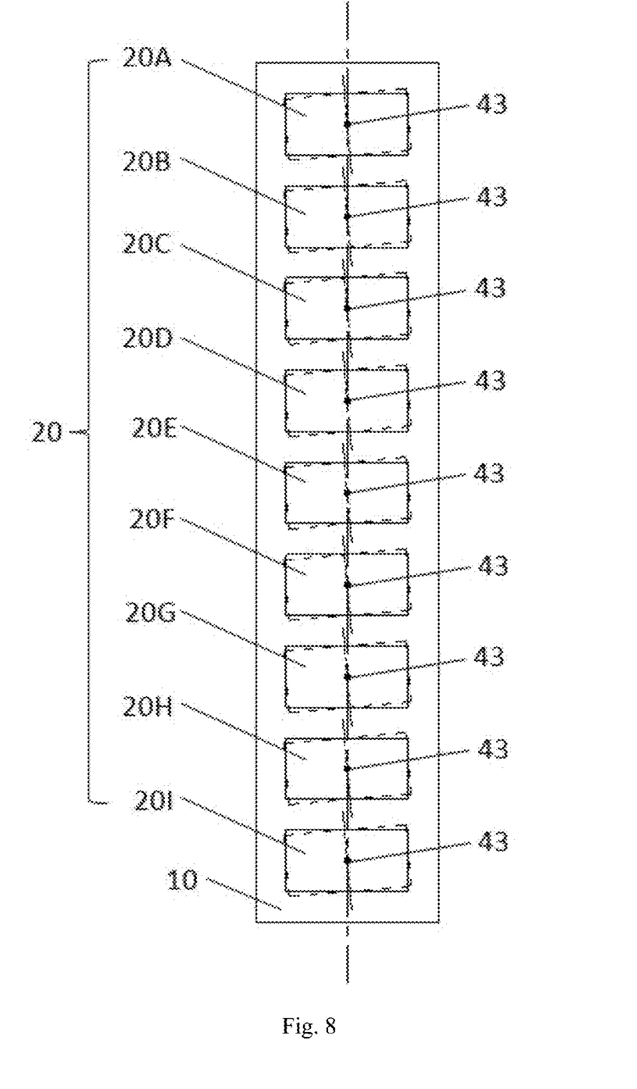
FIG. 8 is a schematic diagram of a dimming state of lighting modules of the present disclosure.

As shown in FIG. 2-7, according to an embodiment of a vehicle lighting device of the present disclosure, the vehicle lighting device includes a bracket 10, a plurality of rotating arms 40 and a plurality of lighting modules 20. Each rotating arm 40 includes a driving column 41 and a rotating shaft 42. The rotating shafts 42 of the rotating arms 40 are horizontally mounted on the bracket 10 in parallel with each other, and thus the rotating arms 40 are sequentially arranged on the bracket 10 from top to bottom and can be arranged diagonally leftwards or rightwards in a vertical direction. The rotating arms 40 can be driven by the corresponding driving columns 41 to rotate around the rotation shafts 42 on the bracket 10. The plurality of lighting modules 20 are respectively mounted on the plurality of rotating arms 40, so that the lighting modules 20 are in the same arrangement state as the rotating arms 40. As shown in FIG. 7, when the driving columns 41 move upwards from an initial state to first driving column positions 41A, the rotating arms 40 rotate clockwise around rotating axis 43 of the rotating shafts 42, light emitting directions of the lighting modules 20 mounted on the rotating arms 40 swing relatively downwards, and corresponding lighting areas also move downwards; and when the driving columns 41 move downwards from an initial state to second driving column positions 41B, the rotating arms 40 rotate counterclockwise around the rotating axis 43 of the rotating shafts 42, and the light emitting directions of the lighting modules 20 mounted on the rotating arms 40 swing relatively upwards, and the corresponding lighting areas also move upwards. Therefore, by driving the driving columns 41 to move up and down, the lighting areas formed by the lighting modules 20 can move up and down in the V-axis direction. Moreover, as shown in FIG. 8, after the rotating arms 40 rotate around the rotating shafts 42, the lighting modules 20 rotate around the respective rotation axis 43 to the dimmed position indicated by a dotted line from the initial position indicated by a solid line, the lighting modules 20 slightly swing, and compared with a dimming mode shown in FIG. 1 in the prior art, the vehicle lighting device of the present disclosure has the features that the bracket 10 of the vehicle lighting device present disclosure does not move, and the displacement of the lighting modules 20 is smaller, so that the space occupied by the vehicle lighting device in the headlight is greatly reduced. Compared with the mode that rotating mechanisms are arranged on the lighting modules 20, the vehicle lighting device has the features that intervals between the lighting modules 20 are smaller, so that the space occupied by the vehicle lighting device in the headlight is greatly reduced as well.

In some embodiments of the present disclosure, as shown in FIGS. 5-8, the vehicle lighting device of the present disclosure further includes a driving part 30. The shape of the driving part 30 is matched with the arrangement state of the lighting modules 20. Two ends of the driving part 30 are provided with an upper end guide column 31 and a lower end guide column 32 respectively. Axis of the upper guide column 31 and the lower guide column 32 are parallel to each other. The driving part 30 is mounted on the bracket 10 through the upper end guide column 31 and the lower end guide column 32 and can move up and down relative to the bracket 10. The driving part 30 is provided with a plurality of slotted holes 33, and the plurality of driving columns 41 are mounted in the plurality of slotted holes 33 correspondingly. As shown in FIG. 5, when moving a the vertical downward direction 90, the driving part 30 drives the plurality of driving columns 41 mounted in the slotted holes 33 to move downwards simultaneously, and the plurality of rotating shafts 42 rotate counterclockwise synchronously, the lighting modules 20 are driven to rotate counterclockwise accordingly, and the lighting areas formed by the lighting modules 20 move upwards in the V-axis direction synchronously, so that the light pattern formed by the vehicle lighting device of the present disclosure ascends in the V-axis direction. When moving in a vertical upward direction 91, the driving part 30 drives the plurality of driving columns 41 mounted in the slotted holes 33 to move upwards simultaneously, the plurality of rotating shafts 42 rotate clockwise synchronously, the lighting modules 20 are driven to rotate clockwise accordingly, and the lighting areas formed by the lighting modules 20 move downwards synchronously in the V-axis direction, so that the light pattern formed by the vehicle lighting device of the present disclosure descends in the V-axis direction. Due to the arrangement of the slotted holes 33, the driving columns 41 can slide left and right in the slotted holes 33 while moving up and down in the slotted holes 33, and thus the rotational movement track of the driving columns 41 is adapted.

In some embodiments of the present disclosure, as shown in FIGS. 4-8, the vehicle lighting device of the present disclosure further includes a driving mechanism and a connecting rod 70. One end of the connecting rod 70 is connected with the driving mechanism, and the other end of the connecting rod 70 is connected with the driving part 30.

The connecting rod 70 may be connected with the driving mechanism and the driving part 30 in a fixed or hinged mode or through a ball head. When moving up and down in the vertical direction, the driving mechanism can drive the connecting rod 70 to move up and down, and drives the driving part 30 to move up and down through the connecting rod 70. When the hinged connection mode or the ball head connection mode is used, a transmission device can also reduce connection stress caused by nonparallelism of the movement track of the driving mechanism and the movement track of the driving part 30, so that the driving mechanism and the driving part 30 can synchronously move more flatly and smoothly.

As some embodiments of the vehicle lighting device of the present disclosure, as shown in FIGS. 4-8, the driving mechanism adopts an electric driving mechanism 50 and/or a manual driving mechanism 60. The electric driving mechanism 50 may adopt an electric cylinder driving mode, a telescopic rod of an electric cylinder is connected with the connecting rod 70; and the electric driving mechanism 50 may also adopt a gear motor screw driving mode, a sliding block on a screw is connected with the connecting rod 70. The manual driving mechanism 60 may be connected to the electric cylinder or the sliding block through a screw structure. When the manual driving mechanism 60 is rotated, the screw structure drives the electric cylinder or the sliding block to move, so that the connecting rod 70 is driven to drive the driving part 30 to move up and down. Through the structure, when the electric driving mechanism 50 is turned off or fails, the manual driving mechanism 60 can be adopted for driving the lighting modules 20 to rotate for dimming.

Figure 9:
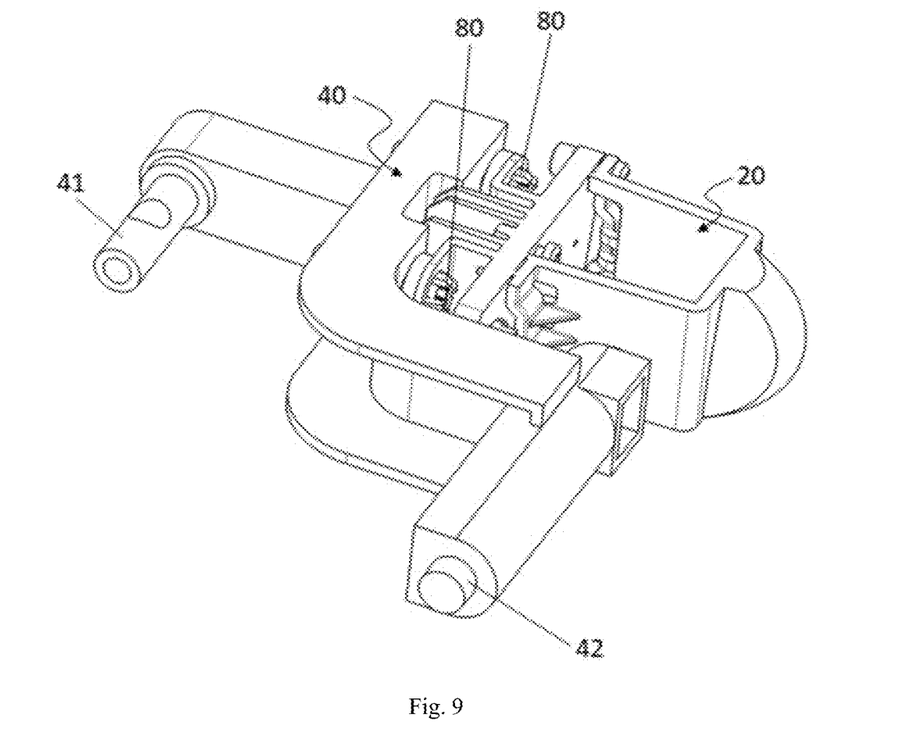
FIG. 9 is a structural schematic diagram of an embodiment of a module dimming mechanism of the present disclosure.

In some embodiments of the present disclosure, as shown in FIG. 5, FIG. 6 and FIG. 9, the lighting modules 20 are mounted at the positions, corresponding to the rotating shafts 42, on the rotating arms 40, namely, centers of the lighting modules 20 are located on straight lines where the axis of the rotating shafts 42 are located. When the rotating shafts 42 rotate, the lighting modules 20 rotate around the centers, the overall spatial displacement of the lighting modules 20 is small at this time, and accordingly the space requirement during dimming is lowered.

Figure 10:
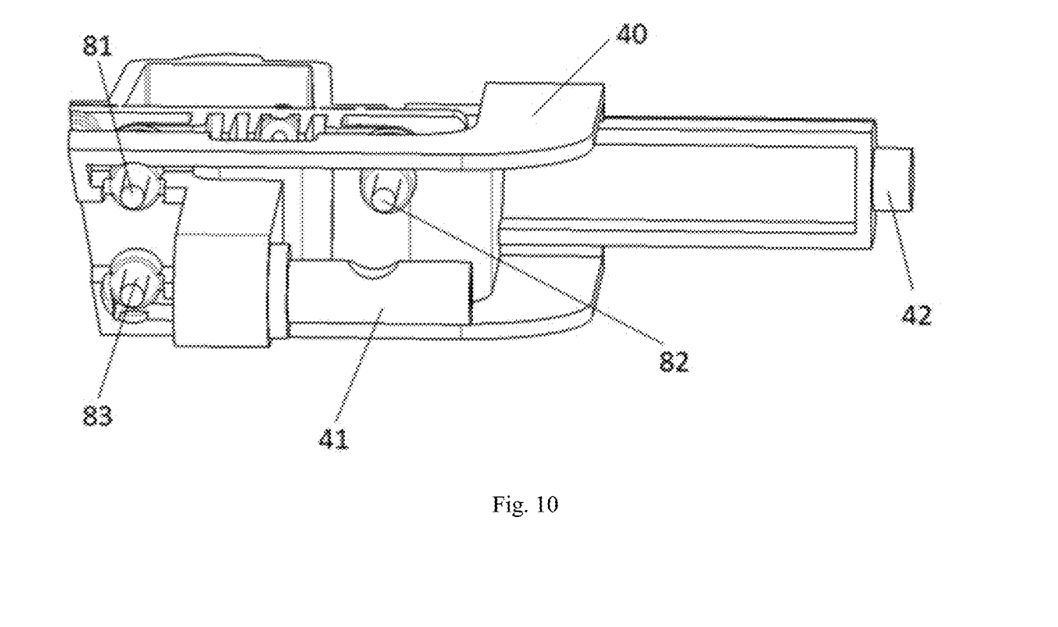
FIG. 10 is a structural schematic diagram in another direction of FIG. 9.

In some embodiments of the present disclosure, as shown in FIGS. 9 and 10, each lighting module 20 is provided with a module dimming mechanism. Each module dimming mechanism includes a first ball-headed screw 81, a second ball-headed screw 82, a third ball-headed screw 83 arranged directly below the first ball-headed screw 81, and three ball-headed nuts 80 matched with the ball-headed screws, wherein the first ball-headed screw 81 and the second ball-headed screw 82 are arranged in parallel and the lighting modules 20 are mounted on the corresponding rotating arms 40 through corresponding module dimming mechanisms. When an external tool is used for driving each second ball-headed screw 82 to rotate, the corresponding lighting module 20 can be rotated around the connecting line of the ball centers of the first ball-headed screw 81 and the third ball-headed screw 83 so as to realize left-right dimming of the lighting module 20; and when each third ball screw 83 is driven to rotate, the corresponding lighting module 20 can be rotated around the connecting line of the ball centers of the first ball-headed screw 81 and the second ball-headed screw 82 so as to realize up-down dimming of the lighting module 20. By arranging the module dimming mechanisms, independent dimming of the lighting modules 20 can be achieved, thus, the relative positions of the lighting areas formed by the lighting modules 20 can be adjusted, and therefore the lighting areas of the lighting modules 20 can be combined to form an ideal design light pattern.

Figure 2:
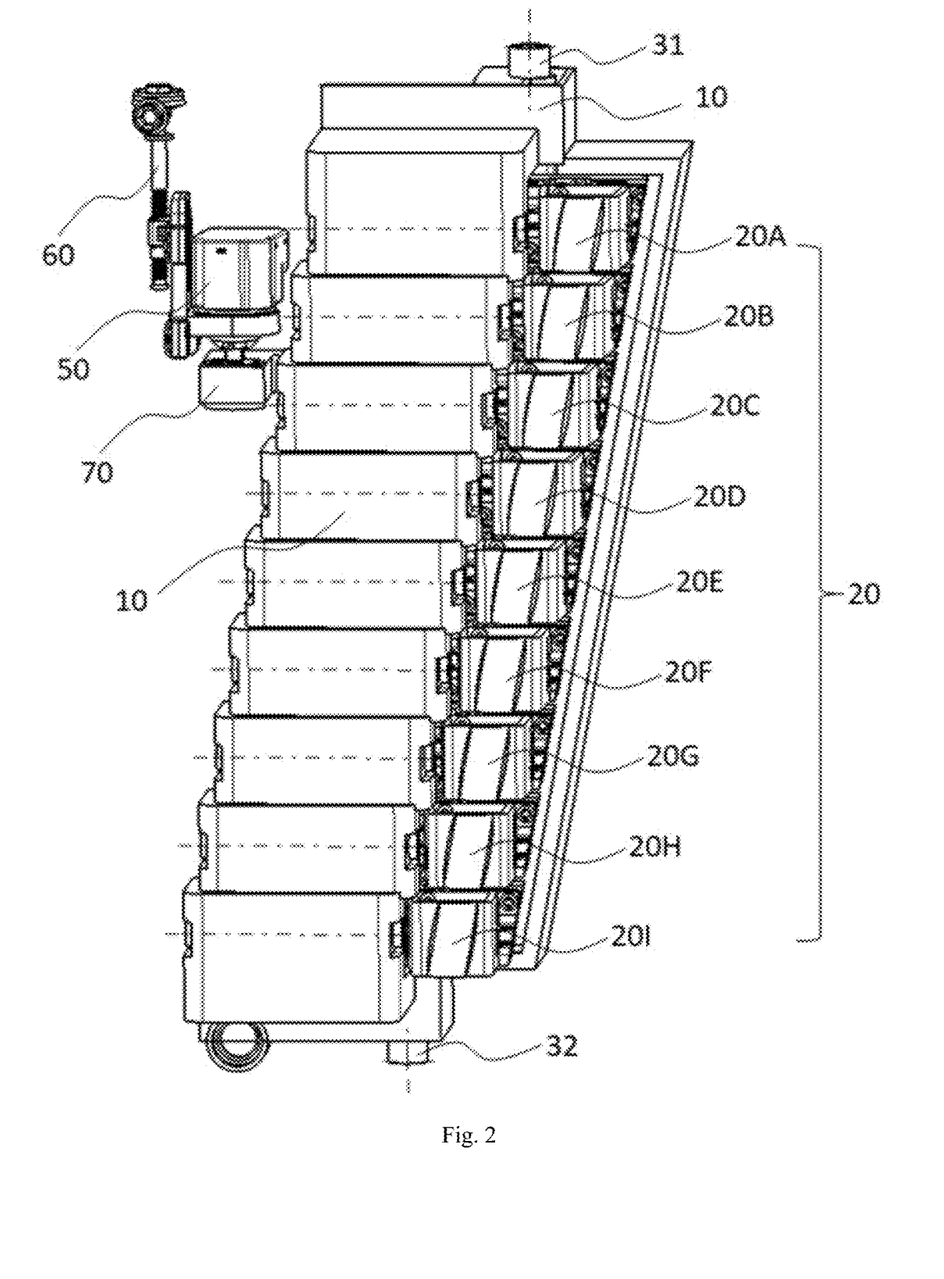
FIG. 2 is a front view of an embodiment of a vehicle lighting device according to the present disclosure.
Figure 3:
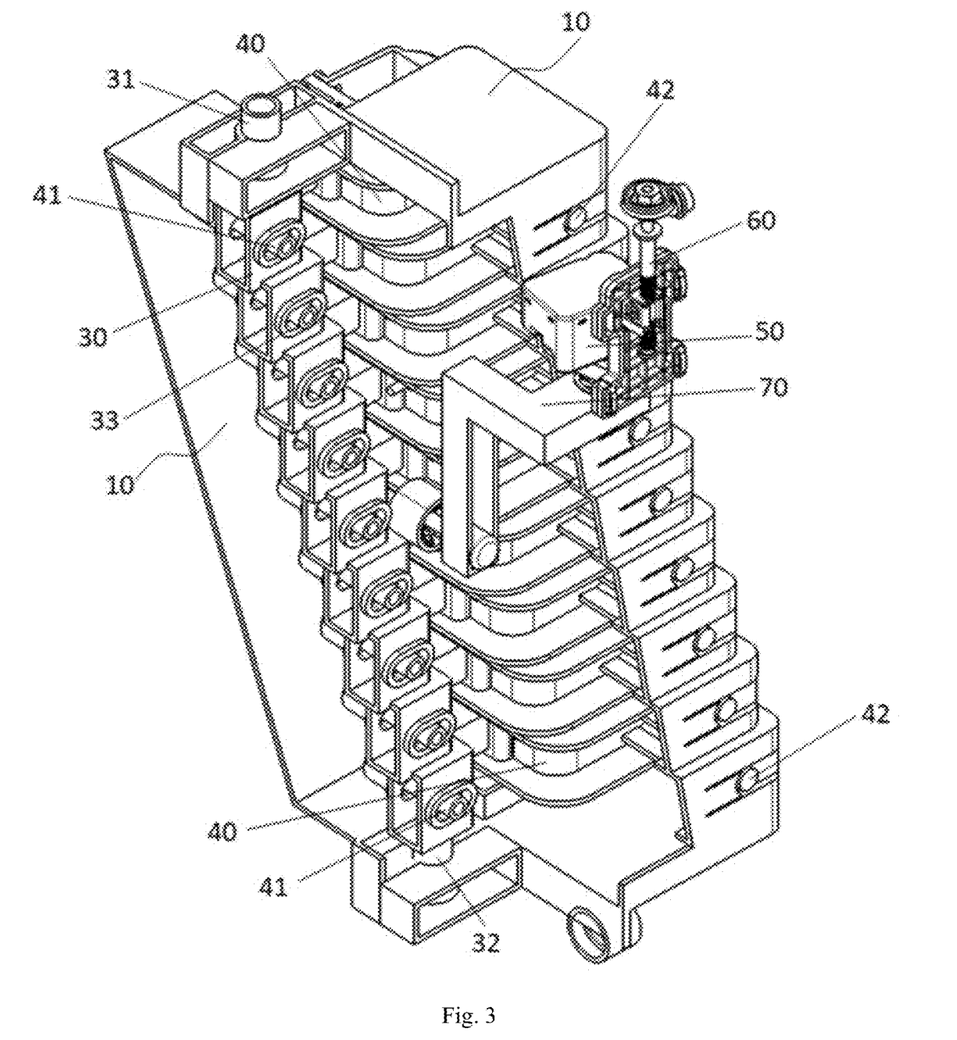
FIG. 3 is a stereoscopic schematic diagram of a rear side of FIG. 2.
Figure 4:
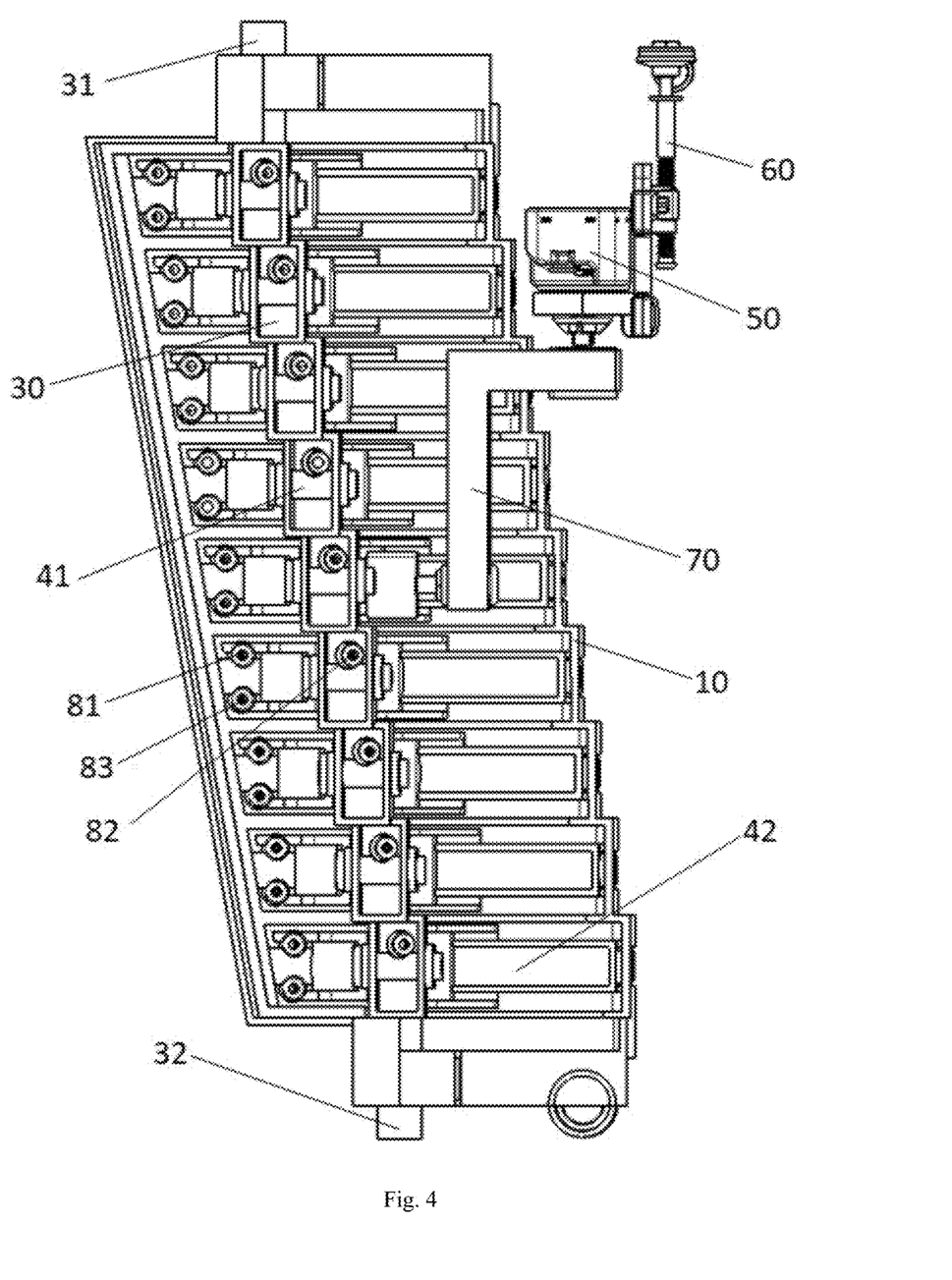
FIG. 4 is a rear view of FIG. 2.

In some embodiments of the present disclosure, the plurality of lighting modules 20 include high beam lighting modules and/or low beam lighting modules. One of the implementation modes shown in FIG. 2 is as follows: the lighting modules 20 include nine lighting modules, namely a first lighting module 20A, a second lighting module 20B, a third lighting module 20C, a fourth lighting module 20D, a fifth lighting module 20E, a sixth lighting module 20F, a seventh lighting module 20G, an eighth lighting module 20H and a ninth lighting module 20I, wherein the first lighting module 20A, the second lighting module 20B and the third lighting module 20C are the low beam lighting modules, and the fourth lighting module 20D, the fifth lighting module 20E, the sixth lighting module 20F, the seventh lighting module 20G, the eighth lighting module 20H and the ninth lighting module 20I are the high beam lighting modules. The lighting modules 20 are sequentially arranged diagonally from top to bottom. Certainly, the numbers of the low beam lighting modules and the high beam lighting modules are not limited to three and six in the implementation mode, and the arrangement is not limited to the up-down arrangement of the low beam lighting modules and the high beam lighting modules in the implementation mode. Also, the low beam lighting modules may be arranged on the lower portion of the vehicle lighting device or even arranged at intervals, but in the end, through dimming performed by the lighting modules 20, the lighting areas of the low beam lighting modules are combined to form a low beam light pattern, and the lighting areas of the high beam lighting modules are combined to form a high beam light pattern.

In some embodiments of the present disclosure, the bracket 10 is rotationally connected to the headlight housing, and the bracket 10 can rotate around the vertical axis relative to the headlight housing. When the bracket 10 rotates around the vertical axis, the vehicle lighting device of the present disclosure swings left and right relative to the headlight housing as a whole, and the low beam light pattern and/or the high beam light pattern formed by the vehicle lighting device can also move left and right along the H-axis direction of the light pattern, so that left-right dimming of the light pattern in the H-axis direction is completed.

By adopting the vehicle lighting device and the vehicle headlight of the present disclosure, the vehicle headlight and the vehicle of the present disclosure also have the beneficial effects brought by the vehicle lighting device of the above embodiments.

In the description of the present disclosure, the description with reference to the terms "one embodiment", "some embodiments", "one implementation mode" and the like means that specific characteristics, structures, materials or features described in conjunction with the embodiments or examples are included in at least one embodiment or example of the present disclosure. In the present disclosure, the schematic expressions of the above terms do not necessarily refer to the same embodiment or example. Furthermore, the specific characteristics, structures, materials or features described may be combined in any proper manner in any one or more embodiments or examples.

The preferred embodiments of the present disclosure have been described in detail above with reference to the accompanying drawings, but the present disclosure is not limited thereto. Within the scope of the technical concept of the present disclosure, various simple modifications can be made to the technical solutions of the present disclosure, including the combination of various specific technical features in any proper manner. In order to avoid unnecessary repetition, various possible combinations are not described separately in the present disclosure. However, the simple modifications and combinations should also be regarded as the content disclosed by the present disclosure, and fall into the protection scope of the present disclosure.

The invention claimed is:

1. A vehicle lighting device, comprising a bracket, a plurality of rotating arms and a plurality of lighting modules, wherein each rotating arm comprises a driving column and a rotating shaft; the plurality of lighting modules are respectively mounted on the corresponding rotating arms; the rotating shafts are rotationally mounted on the bracket so that the rotating arms are independently driven by the driving columns to rotate around the rotating shafts; and the rotating shafts are horizontally arranged in parallel;

the driving part comprises an upper end guide column, a lower end guide column and a plurality of slotted holes, wherein axis of the upper end guide column and the lower end guide column are parallel to each other; the driving part is mounted on the bracket through the upper end guide column and the lower end guide column and adapted to move up and down relative to the bracket; and the plurality of driving columns are mounted in the plurality of slotted holes correspondingly in a sliding manner.

2. The vehicle lighting device according to claim 1, further comprising a driving mechanism and a connecting rod, wherein one end of the connecting rod is connected with the driving mechanism, and the other end of the connecting rod is connected with the driving part; the driving mechanism is adapted to drive the connecting rod to move up and down, and drive the driving part to move up and down through the connecting rod.

3. The vehicle lighting device according to claim 2, wherein the driving mechanism comprises an electric driving mechanism and/or a manual driving mechanism, and the electric driving mechanism and the manual driving mechanisms are both adapted to drive a connecting end of the connecting rod and the driving mechanism to move up and down.

4. The vehicle lighting device according to claim 1, wherein each lighting module is arranged on a straight line where an axis of the corresponding rotating shaft is located.

5. The vehicle lighting device according to claim 1, wherein each lighting module comprises a module dimming mechanism; each module dimming mechanism comprises three ball-headed nuts which are not located on a same straight line, and three ball-headed screws matched with the ball-headed nuts; and the lighting modules are respectively mounted on the rotating arms through the module dimming mechanisms.

6. The vehicle lighting device according to claim 1, wherein the plurality of lighting modules comprise high beam lighting modules and/or low beam lighting modules.

7. The vehicle lighting device according to claim 1, wherein the bracket is mounted on a headlight housing and adapted to rotate around a vertical axis relative to the headlight housing.

8. A vehicle headlight, comprising the vehicle lighting device according to claim 1.

9. A vehicle, comprising the vehicle headlight according to claim 8.

\* \* \* \* \*